United States Patent Office 3,591,576
Patented July 6, 1971

---

3,591,576
CALCIUM OR MANGANESE LAKES OF PHENYL-AZO-NAPHTHOL ACID DYESTUFFS
Heinz Haubrich, Leverkusen, Germany, assignor to Farbenfabriken Bayer Aktiengesellschaft, Leverkusen, Germany
No Drawing. Filed May 24, 1968, Ser. No. 731,711
Claims priority, application Germany, June 3, 1967, F 52,595
Int. Cl. C07c *107/08;* C09b *29/16, 45/14*
U.S. Cl. 260—151                                   1 Claim

ABSTRACT OF THE DISCLOSURE

Calcium or manganese lakes of the azo dyestuff of the formula

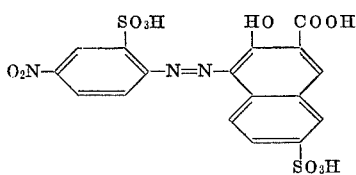

are produced for use as pigment dyestuffs, adapted for incorporation in lacquers and varnishes, synthetic materials, spinning masses and in the field of paper and textile printing. The lakes exhibit particularly good light fastness properties.

---

It has been found that valuable new azo dyestuffs are obtained by converting the dyestuff of the formula

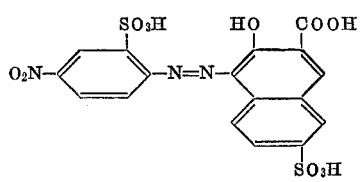
(I)

into the calcium and/or manganese lake by treatment with calcium and/or manganese salts.

For laking, the dyestuff of the Formula I can be used in the form of the free acid as well as in the form of water-soluble salts, for example, the potassium or sodium salts. Calcium salts suitable for laking are, for example, calcium chloride, calcium acetate or calcium formate, suitable manganese salts are, for example, maganese chloride, manganese sulphate or manganese acetate.

The laking, i.e., the reaction of the calcium and/or manganese salts on the dyestuff of the Formula I, is preferably carried out in an aqueous medium at temperatures of 40–95° C.

The starting dyestuff of the Formula I can be prepared in known manner by coupling diazotised 2-amino-5-nitrobenzene-sulphonic acid in the dissolved or suspended form with 2-hydroxy-3-naphtho-6-sulphonic acid.

The new calcium and manganese lakes of the dyestuff of the Formula I are highly valuable red pigment dye-stuffs which are insoluble in water and in the usual organic solvents. They are eminently suitable for being incorporated with lacquers and varnishes, synthetic materials and spinning masses as well for being used in paper and textile printing. They are characterised by outstanding fastness to overvarnishing in nitroalkyd resin or stoving lacquers, by high fastness to migration in synthetic materials and by very good fastness to light.

EXAMPLE 21.8 g. 2-amino-5-nitrobenzene-sulphonic acid are finely stirred with 600 ml. of water and 28 ml. hydrochloric acid (19.5° Bé.) and diazotised at 0–10° C. with 23 ml. of a 30% sodium nitrite solution. To the diazo solution there are added 25 ml. glacial acetic acid and subsequently an aqueous solution of 27 g. of the sodium salt of 2-hydroxy-3-naphtho-6-sulphonic acid. When the coupling is completed, 18 g. calcium chloride are added, the mixture is heated at 90° C. for 2 hours, the product is filtered off with suction, washed, and dried at 50–60° C.

3 g. of the red pigment dyestuff so obtained are ground with 100 g. of a nitroalkyd resin lacquer (with a solids content of 22%) in a funnel mill. With this lacquer, adjusted to spraying viscosity, there can be produced red lacquerings of very good fastness to overvarnishing.

The dyestuff is just as eminently suited for the preparation of graphic prints which are fast to solvents and for the dyeing of synthetic materials fast to migration.

If the calcium chloride in the above example is replaced with manganese chloride, then the resultant coloured lake has similar properties, but its shade is markedly more blue than that of the calcium lake.

I claim:
1. Calcium or maganese lakes of the azo dyestuff of the formula

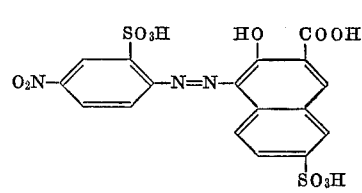

References Cited

UNITED STATES PATENTS

| | | | |
|---|---|---|---|
| 741,029 | 10/1903 | Gley et al. | 106—289 |
| 2,744,027 | 5/1956 | Struve et al. | 260—202X |

OTHER REFERENCES

Georgievics and Grandmougin, Dye Chemistry, Trans. F. A. Mason, London; Scott, Greenwood and son, 1920, page 19.

CHARLES B. PARKER, Primary Examiner

C. F. WARREN, Assistant Examiner

U.S. Cl. X.R.

8—62; 106—289; 117—154; 260—201, 37